(12) United States Patent
Joos

(10) Patent No.: US 7,425,379 B2
(45) Date of Patent: Sep. 16, 2008

(54) PASSIVE ELECTRODE BLANKETING IN A FUEL CELL

(75) Inventor: Nathaniel Ian Joos, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 527 days.

(21) Appl. No.: 10/875,288

(22) Filed: Jun. 25, 2004

(65) Prior Publication Data

US 2005/0026022 A1 Feb. 3, 2005

Related U.S. Application Data

(60) Provisional application No. 60/482,010, filed on Jun. 25, 2003, provisional application No. 60/495,091, filed on Aug. 15, 2003.

(51) Int. Cl.
*H01M 8/04* (2006.01)
*H01M 8/06* (2006.01)

(52) U.S. Cl. .............................. 429/13; 429/22; 429/34

(58) Field of Classification Search ................... 429/13, 429/22, 34
See application file for complete search history.

(56) References Cited

U.S. PATENT DOCUMENTS

| | | | |
|---|---|---|---|
| 4,857,420 A | 8/1989 | Maricle et al. | |
| 5,848,567 A | 12/1998 | Chaing | |
| 6,255,010 B1 * | 7/2001 | George et al. | 429/30 |
| 6,358,638 B1 | 3/2002 | Rock et al. | |
| 6,410,179 B1 | 6/2002 | Canfield et al. | |
| 6,500,580 B1 | 12/2002 | Marvin et al. | |
| 6,514,635 B2 | 2/2003 | Van Dine et al. | |
| 6,569,549 B1 | 5/2003 | Sawyer | |
| RE38,156 E | 6/2003 | Strasser et al. | |
| 6,635,370 B2 | 10/2003 | Condit et al. | |
| 6,984,464 B2 | 1/2006 | Margiott et al. | |
| 2001/0055705 A1 | 12/2001 | Yagi | |
| 2002/0076582 A1 | 6/2002 | Reiser et al. | |
| 2002/0098393 A1 | 7/2002 | Dine et al. | |
| 2002/0102443 A1 | 8/2002 | Yang et al. | |
| 2002/0172852 A1 | 11/2002 | Frank et al. | |
| 2002/0182456 A1 | 12/2002 | Condit et al. | |
| 2003/0031914 A1 | 2/2003 | Frank et al. | |
| 2003/0129462 A1 | 7/2003 | Yang et al. | |

(Continued)

FOREIGN PATENT DOCUMENTS

DE 100 59 393 A1 6/2002

(Continued)

*Primary Examiner*—Gregg Cantelmo
(74) *Attorney, Agent, or Firm*—Bereskin & Parr

(57) ABSTRACT

A fuel cell module is provided having a fuel cell stack, a parasitic load connectable across the electrodes, and a reactant reservoir for storing an amount of a first reactant such as hydrogen. When the fuel cell module is shutdown, the stored amount of the first reactant can be drawn to react with an amount of a second reactant (e.g., oxygen in air) remaining in the stack to electrochemically consume the first and second reactants, thereby leaving a mixture that substantially comprises a non-reactive agent (e.g., nitrogen), thereby passively blanketing the electrodes. The parasitic load limits the voltage of the fuel cell stack and induces the electrochemical consumption of the first and second reactants remaining in the stack during shutdown. A pressure gradient between the electrodes and an optional check valve may allow for movement of the non-reactive agent between electrodes. A process related to said fuel cell module is also provided.

31 Claims, 6 Drawing Sheets

U.S. PATENT DOCUMENTS

| | | |
|---|---|---|
| 2003/0134165 A1 | 7/2003 | Reiser et al. |
| 2003/0186106 A1 | 10/2003 | Frank et al. |
| 2003/0228504 A1 | 12/2003 | Konrad et al. |
| 2004/0001980 A1 | 1/2004 | Balliet et al. |

FOREIGN PATENT DOCUMENTS

| | | |
|---|---|---|
| EP | 1 083 616 | 3/2001 |
| JP | 11329469 A * | 11/1999 |
| JP | 2002093448 | 3/2002 |
| WO | WO 96/12316 | 4/1996 |
| WO | WO 02/059997 | 8/2002 |
| WO | WO 02/059997 A1 | 8/2002 |
| WO | WO 02/099911 | 12/2002 |
| WO | WO 2004/004057 | 1/2004 |

* cited by examiner

PASSIVE ELECTRODE BLANKETING IN A FUEL CELL

PRIORITY CLAIM

This application claims the benefit of U.S. Provisional Application No. 60/482,010 (filed on Jun. 25, 2003) and the benefit of U.S. Provisional Application No. 60/495,091 (filed on Aug. 15, 2003). Accordingly, the entire contents of both U.S. Provisional Application Nos. 60/482,010 and 60/495,091 are hereby incorporated by reference.

FIELD OF THE INVENTION

The invention relates to fuel cells, and, in particular to reducing the rate of wear and degradation experienced by some components of a fuel cell during shutdown and restarting periods.

BACKGROUND OF THE INVENTION

A fuel cell converts chemical energy stored in a fuel into a useful form of energy, such as for example, electricity. One example of a particular type of fuel cell is a Proton Exchange Membrane (PEM) fuel cell that is operable to produce electricity.

A typical PEM fuel cell includes an electrolyte membrane arranged between an anode electrode and a cathode electrode. Hydrogen fuel is supplied to the anode electrode and an oxidant is supplied to the cathode electrode. Within the PEM fuel cell the hydrogen fuel and the oxidant are employed as reactants in a set of complementary electrochemical reactions that yield electricity, heat and water.

A number of factors cause other undesired reactions to occur that increase the rate of wear and degradation experienced by some components of a PEM fuel cell. For example, small amounts of hydrogen fuel and oxidant remaining inside a PEM fuel cell, after respective supplies of these reactants are closed off, are known to combust during shutdown and restarting processes. Combustion within a PEM fuel cell causes the deterioration of various components including the electrolyte membrane and catalyst layers deposited on the electrodes. The cumulative deterioration of various components significantly reduces the efficiency of the PEM fuel cell and may lead to failure of the PEM fuel cell.

More specifically, combustion as opposed to electrochemical consumption of the hydrogen and oxygen occurs because the conditions within a PEM fuel cell module start to change as support systems operable during the normal operation (i.e. the "on" state) of the PEM fuel cell module are switched to an "off" state. As the internal conditions change, some hydrogen molecules diffuse to the cathode side of the membrane and burn in the presence of the oxygen. Similarly, some oxygen molecules diffuse across the membrane and react with the hydrogen fuel on the anode side of the membrane. The diffusion of hydrogen across the membrane is actually more common (in the absence of a driving differential pressure across the membrane) since hydrogen molecules are smaller than oxygen molecules, and, thus more readily diffuse through the membrane.

Another undesired reaction that may occur is the electrochemical corrosion of at least one catalyst layer within a PEM fuel cell. This further deteriorates the performance of a PEM fuel cell.

SUMMARY OF THE INVENTION

According to an aspect of an embodiment of the invention there is provided a fuel cell module having: a fuel cell stack including at least one fuel cell, each fuel cell including an anode electrode, a cathode electrode and an electrolyte medium arranged between the anode electrode and the cathode electrode, wherein during normal operation the anode electrode is provided with a first reactant and the cathode electrode is provided with a first mixture containing a second reactant and a non-reactive agent; a parasitic load that is connectable across the anode and the cathode electrodes; and a reactant reservoir, connectable to the anode electrode, for storing an amount of the first reactant suitable for a shutdown process of the fuel cell module, whereby, in use when the fuel cell module is shutdown, the stored amount of the first reactant is drawn from the reactant reservoir and electrochemically reacts with an amount of the second reactant remaining in the fuel cell module, to electrochemically consume all of the amounts of the first and second reactants, thereby leaving a second mixture that substantially comprises the non-reactive agent.

In some embodiments the reactant reservoir is sized such that a near stoichiometric amount of the first reactant stored in the reactant reservoir to electrochemically consume the amount of the second reactant remaining in the fuel cell module during the shutdown process so as to deter other undesired reactions from occurring and cause respective pressure drops within the fuel cell module as the remaining amounts of the first and second reactants are electrochemically consumed.

In some embodiments the reactant reservoir is sized such that the amount of the first reactant stored in the reactant reservoir is less than enough to electrochemically consume the entire amount of the second reactant remaining in the fuel cell module during the shutdown process so as to deter other undesired reactions from occurring, and refillable during the shutdown process so that almost all of the remaining amount of the second reactant is electrochemically consumed by additional amounts of the first reactant added to the reactant reservoir during the shutdown process.

According to aspects of another embodiment of the invention there is provided a fuel cell module having: a fuel cell including a first electrode, a second electrode and an electrolyte medium arranged between the first and second electrodes, wherein during normal operation the first electrode is provided with a first reactant and the second electrode is provided with a first mixture containing a second reactant and a non-reactive agent; a parasitic load that is connectable across the first and second electrodes; and, a reactant reservoir, connectable to the first electrode, for storing an amount of the first reactant suitable for a shutdown process of the fuel cell module, whereby, in use when the fuel cell module is shutdown, the stored amount of the first reactant is drawn from the reactant reservoir and electrochemically reacts with an amount of the second reactant remaining in the fuel cell module, to electrochemically consume all of the amounts of the first and second reactants, thereby leaving a second mixture that substantially comprises the non-reactive agent.

According to aspects of another embodiment of the invention there is provided a process for shutting down a fuel cell, the fuel cell including a first electrode, a second electrode and an electrolyte membrane arranged between the first and second electrodes, wherein during normal operation the first electrode is provided with a first reactant and the second electrode is provided with a first mixture containing a second reactant and a non-reactive agent, the process comprising:

stopping an inflow of the first reactant into the first electrode; cutting-off power to supporting balance of plant elements drawing current through a parasitic load connectable across the first and second electrodes; providing a pre-stored near stoichiometric amount of a first reactant for the electrochemical consumption of a remaining amount of a second reactant; and, permitting a delayed inflow of an amount of the first mixture into the second electrode; wherein the near stoichiometric amount of the first reactant electrochemically reacts with the remaining amount of the second reactant, thereby leaving a second mixture that substantially comprises the non-reactive agent.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION OF THE INVENTION

A fuel cell module is typically made up of a number of fuel cells connected in series to form a fuel cell stack. The fuel cell module also includes a suitable combination of associated structural elements, mechanical systems, hardware, firmware and software that is employed to support the function and operation of the fuel cell module. Such items include, without limitation, piping, sensors, regulators, current collectors, seals and insulators.

Figure 1:
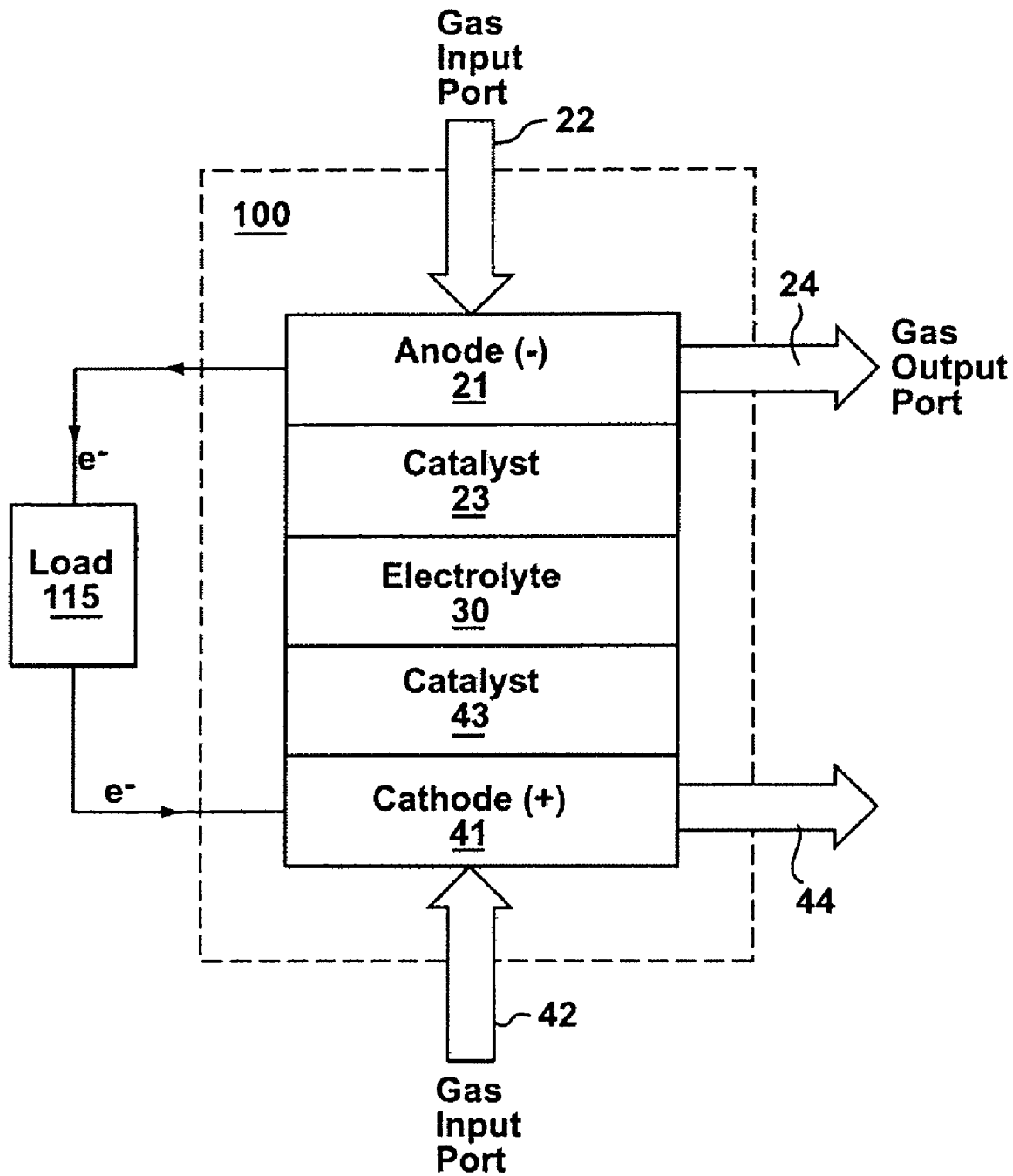
FIG. 1 is a simplified schematic diagram of a fuel cell module.

Referring to FIG. 1, shown is a simplified schematic diagram of a Proton Exchange Membrane (PEM) fuel cell module, simply referred to as fuel cell module 100 hereinafter, that is described herein to illustrate some general considerations relating to the operation of fuel cell modules. It is to be understood that the present invention is applicable to various configurations of fuel cell modules that each include one or more fuel cells.

There are a number of different fuel cell technologies, and in general, this invention is expected to be applicable to all types of fuel cells. Very specific example embodiments of the invention have been developed for use with Proton Exchange Membrane (PEM) fuel cells. Other types of fuel cells include, without limitation, Alkaline Fuel Cells (AFC), Direct Methanol Fuel Cells (DMFC), Molten Carbonate Fuel Cells (MCFC), Phosphoric Acid Fuel Cells (PAFC), Solid Oxide Fuel Cells (SOFC) and Regenerative Fuel Cells (RFC).

Aspects of some example embodiments of the invention are described herein with respect to PEM fuel cell modules that employ hydrogen as a fuel and air as a source for an oxidant. Those skilled in the art will appreciate that air is approximately 80% nitrogen ($N_2$) and 20% oxygen ($O_2$) and is thus a suitable source of the oxidant. Moreover, these percentages have been approximated ignoring the presence of other gases in the atmosphere (e.g. $CO_2$, CO, $SO_2$, PbS, etc.).

The fuel cell module 100 includes an anode electrode 21 and a cathode electrode 41. The anode electrode 21 includes a gas input port 22 and a gas output port 24. Similarly, the cathode electrode 41 includes a gas input port 42 and a gas output port 44. An electrolyte membrane 30 is arranged between the anode electrode 21 and the cathode electrode 41.

The fuel cell module 100 also includes a first catalyst layer 23 between the anode electrode 21 and the electrolyte membrane 30, and a second catalyst layer 43 between the cathode electrode 41 and the electrolyte membrane 30. In some embodiments the first and second catalyst layers 23, 43 are deposited on the anode and cathode electrodes 21, 41, respectively.

A load 115 is coupled between the anode electrode 21 and the cathode electrode 41.

In operation, hydrogen fuel is introduced into the anode electrode 21 via the gas input port 22 under some predetermined conditions. Examples of the predetermined conditions include, without limitation, factors such as flow rate, temperature, pressure, relative humidity and a mixture of the hydrogen with other gases. The hydrogen reacts electrochemically according to reaction (1), given below, in the presence of the electrolyte membrane 30 and the first catalyst layer 23.

$$H_2 \rightarrow 2H^+ + 2e^- \quad (1)$$

The chemical products of reaction (1) are hydrogen ions (i.e. cations) and electrons. The hydrogen ions pass through the electrolyte membrane 30 to the cathode electrode 41 while the electrons are drawn through the load 115. Excess hydrogen (sometimes in combination with other gases and/or fluids) is drawn out through the gas output port 24.

Simultaneously an oxidant, such as oxygen in the air, is introduced into the cathode electrode 41 via the gas input port 42 under some predetermined conditions. Examples of the predetermined conditions include, without limitation, factors such as flow rate, temperature, pressure, relative humidity and a mixture of the oxidant with other gases. The excess gases, including un-reacted oxidant and the generated water are drawn out of the cathode electrode 41 through the gas output port 44.

The oxidant reacts electrochemically according to reaction (2), given below, in the presence of the electrolyte membrane 30 and the second catalyst layer 43.

$$1/2 O_2 + 2H^+ + 2e^- \rightarrow H_2O \quad (2)$$

The chemical product of reaction (2) is water. The electrons and the ionized hydrogen atoms, produced by reaction (1) in the anode electrode 21, are electrochemically consumed in reaction (2) in the cathode electrode 41. The electrochemical reactions (1) and (2) are complementary to one another and show that for each oxygen molecule ($O_2$) that is electrochemically consumed two hydrogen molecules ($H_2$) are electrochemically consumed.

Continuously supplying a fuel cell module (e.g. the fuel cell module 100 illustrated in FIG. 1) with hydrogen fuel and oxidant to drive electrochemical reactions (1) and (2) is wasteful and is unnecessary in many situations, such as, for example, where there is a fluctuating or intermittent load. However, in some instances shutting down a fuel cell module initiates one or more undesired reactions that degrade some components of the fuel cell module. Thus, it is desirable to be able to reliably turn-off (i.e. shutdown) and re-start a fuel cell module without causing excessive degradation to some components of the fuel cell module. In some embodiments of the invention there is provided a modification to a fuel cell module that reduces the rate of wear and degradation experienced by some components of the fuel cell module during shutdown and re-starting periods. In some embodiments the modification is further adapted to passively reduce the rate of wear and degradation, whereas in other embodiments active mechanisms are employed to support passive reduction in the rate of wear and degradation. In particular, in some embodiments of the invention the rate of wear and degradation is reduced by reducing the amount of combustion of the remaining reactants while increasing the electrochemical consumption of those reactants during a shutdown process.

Figure 2:
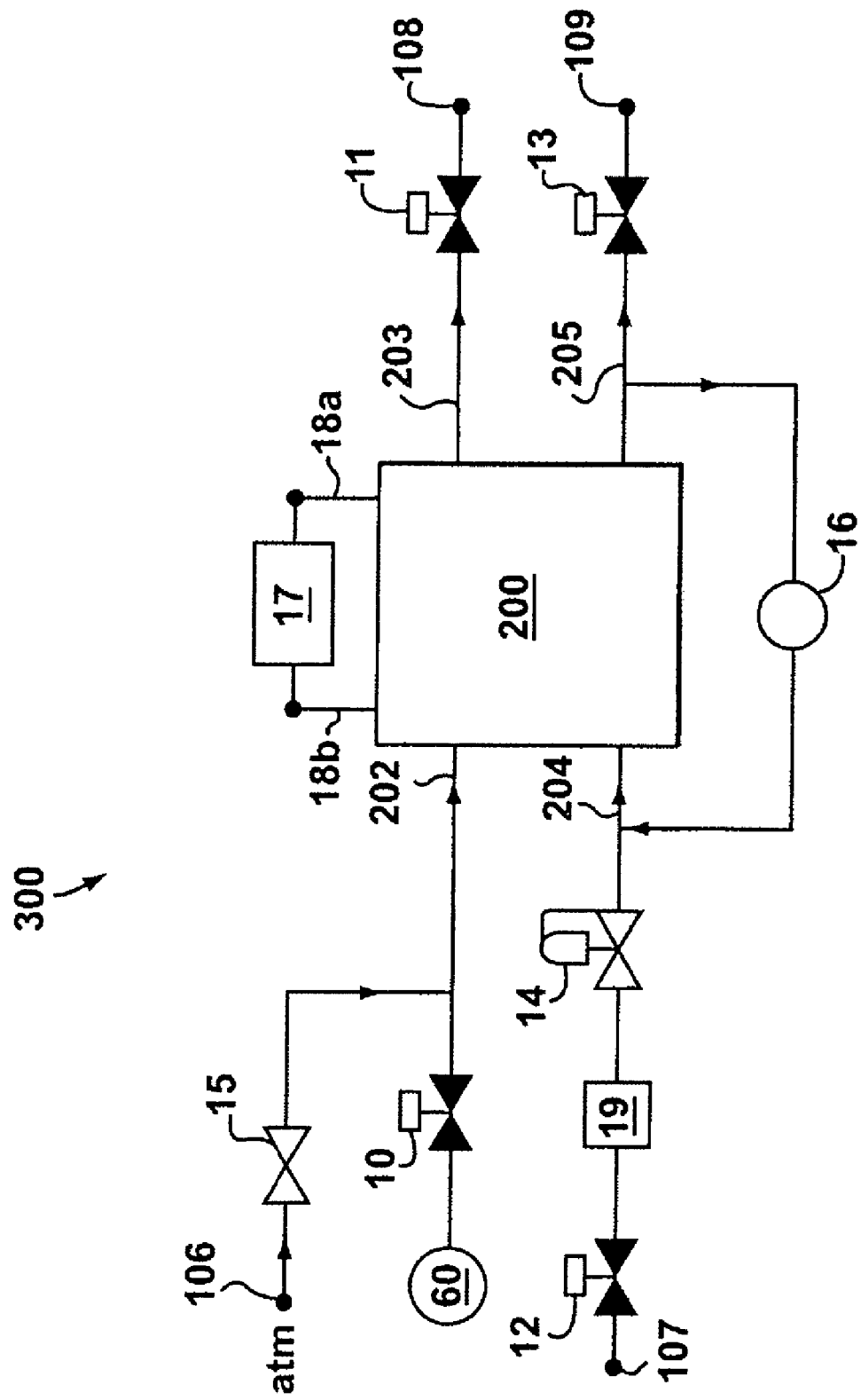
FIG. 2 is a schematic diagram illustrating a first arrangement of a fuel cell module according to aspects of an embodiment of the invention.

Referring to FIG. 2, shown is a schematic diagram illustrating a fuel cell module 300 arranged according to aspects of an embodiment of the invention. Those skilled in the art will appreciate that a fuel cell module includes a suitable combination of supporting elements, commonly referred to as 'balance of plant', and that the fuel cell module 300 is illustrated showing only those elements necessary to describe aspects of this embodiment of the invention.

The fuel cell module 300 includes a fuel cell stack 200 that is made up of one of more PEM fuel cells. Each PEM fuel cell (not shown) includes an electrolyte membrane arranged between an anode electrode and a cathode electrode as schematically illustrated in FIG. 1. The fuel cell stack 200 has a cathode inlet port 202, a cathode outlet port 203, an anode inlet port 204 and an anode outlet port 205. The cathode inlet and outlet ports 202,203 are fluidly connected to each of the respective cathode electrodes included in the fuel cell stack 200. Similarly, the anode inlet and outlet ports 204,205 are fluidly connected to each of the respective anode electrodes included in the fuel cell stack 200.

The fuel cell stack 200 also includes electrical connections 18a,b across which a load (e.g., an electric motor) is connectable. A relatively small parasitic load 17 is optionally connected across the electrical connections 18a,b of the fuel cell stack 200. The small parasitic load 17 helps to limit the voltage response during a shutdown process, which is described in more detail below.

The value of the parasitic load 17 is preferably chosen to be relatively small compared to an actual load (e.g. the electric motor) that the fuel cell module 300 supplies power too, so that the amount of power dissipated by the parasitic load 17 during normal operation is relatively small compared to the amount of power dissipated through the actual load. In a very specific example, the parasitic load 17 is chosen such that it dissipates less than 0.03% the amount of power dissipated by the actual load during normal operation.

In some embodiments, as shown in FIG. 2, the small parasitic load 17 is permanently coupled across the electrical connections 18a,b; and thus, power is dissipated by the small parasitic load 17 during normal operation. In other embodiments the small parasitic load 17 is arranged so that it is coupled across the electrical connections 18a,b of the fuel cell stack 200 immediately before or after the fuel cell module 300 is shutdown and is decoupled from the fuel cell stack 200 during normal operation.

In some other alternative embodiments the parasitic load 17 is made-up of internal impedances within the fuel cell stack 200. In particular, in some embodiments the membrane(s) included in the fuel cell stack 200 provide enough of an internal resistance to serve as an adequate parasitic resistance during a shutdown process for limiting the voltage response of the fuel cell stack 200.

The fuel cell module 300 includes input valves 10 and 12 that are controllable to cut-off the inflow of reactant gases to the cathode inlet port 202 and the anode inlet port 204, respectively. Similarly, output valves 11 and 13 are provided to controllably cut-off the outflow of exhaust gases from the cathode outlet port 203 and the anode outlet port 205, respectively.

The input valve 10 is connected in series between the cathode inlet port 202 and a blower 60. The blower 60 is any device (e.g., a motorized fan, a compressor, etc.) suitable to force air into the cathode inlet port 202 when the valve 10 is open. Optionally, the blower 60 also serves to passively deter, but not necessarily stop, the free flow of air into the cathode inlet port 202 when power is cut-off from the blower 60. This is described in more detail below with reference to FIGS. 3, 4 and 6.

The input valve 12 is connected in series between a fuel supply port 107 and the anode inlet port 204. The fuel supply port 107 is further connectable to a hydrogen fuel supply vessel (not shown) or some other hydrogen fuel delivery system (not shown). A fuel reservoir 19 and a flow control device 14 are connected respectively in series between the input valve 12 and the anode inlet port 204.

The output valve 11 is connected in series between the cathode outlet port 203 and a first exhaust port 108. Similarly, the output valve 13 is connected in series between the anode outlet port 205 and a second exhaust port 109. The exhaust ports 108 and 100 are each optionally connectable to other devices, such as for example, an exhaust system including an electrolyzer for re-cycling exhaust gases or liquids from the fuel cell module 300.

A check valve 15 is connected between an air supply port 106 to the ambient environment (not illustrated) and the cathode inlet port 202, such that the check valve 15 is in parallel with the input valve 10. In some embodiments, the check valve 15 is a pressure sensitive mechanism that opens when the pressure at the cathode inlet port 202 drops below the air pressure of the ambient environment by a pre-set amount, known as a cracking pressure. In some embodiments the cracking pressure is specifically set to correspond to a predetermined pressure differential between the air pressure in the ambient environment and the pressure inside of the cathode inlet port 202. In related embodiments the predetermined pressure differential corresponds to a total volume of a mixture of gases in the cathode electrodes in the fuel cell stack 200 and, in particular, to an amount of oxygen in the cathode electrodes relative to other gases, such as for example nitrogen from the air. This is described in further detail below with reference to FIG. 3.

The hydrogen reservoir 19 is provided to store a fixed amount of hydrogen that is employed during a shutdown process of the fuel cell module 300 that is described in further detail below with reference to FIG. 3. In some embodiments, the hydrogen reservoir 19 is a vessel that is appropriately sized to store enough hydrogen fuel to substantially electrochemically consume the oxygen remaining in the fuel cell module 300 when the valves 10, 11, 12 and 13 are closed and the forced inflow of air from the blower 60 is terminated. In other embodiments, the hydrogen reservoir 19 is made-up of a predetermined length of hose or tubing (possibly coiled) for storing enough hydrogen for the same purpose. Alternatively, in other embodiments, the hydrogen reservoir 19 is smaller than required but the amount of hydrogen fuel in the hydrogen reservoir 19 is replenished as required during a shutdown process so that enough hydrogen fuel is provided to substantially electrochemically consume the remaining oxygen. Moreover, those skilled in the art would appreciate that the amount of hydrogen (or reactant of interest) remaining in a fuel cell stack after shutdown is to be taken into consideration when sizing a hydrogen (reactant) reservoir.

The flow control device 14 is provided to regulate the supply of hydrogen fuel delivered to the anode inlet port 204 by, for example, setting the pressure of the hydrogen fuel delivered to the anode inlet port 204. In some embodiments the flow control device 14 is specifically a forward pressure regulator that is dome loaded using air pressure in combination with a bias spring. The forward pressure regulator sets the pressure at the anode inlet port 204 relative to the pressure at the cathode inlet port 202 by some amount. In one very specific example the pressure at the anode inlet port 204 is regulated to be higher than the pressure at the cathode inlet port 202 by a predetermined fixed amount. In some embodiments a flow control device requires a power supply for operation, whereas in other embodiments a flow control device is a passive element, such as for example, a passive forward pressure regulator.

The fuel cell module 300 optionally includes a hydrogen recirculation pump 16 connecting the anode outlet port 205 to the anode inlet port 204. During normal operation of the fuel cell module 300 the hydrogen recirculation pump 16 is operable to re-circulate some portion of the unused hydrogen expelled through the anode outlet port 205 back to the anode inlet port 204.

Examples of the types of valves that are usable for the valves 10, 11, 12 and 13 include, without limitation, normally closed valves, normally open valves and latching valves. Those skilled in the art would appreciate that various other types of valves may be suitably employed.

In some embodiments some of the valves 10, 11, 12 and 13 are normally closed valves. A normally closed valve is opened, thus permitting free flow of gases (or liquids), only when a control signal (or some electromotive force) is continuously supplied to the particular valve. That is, when power is not supplied to a particular normally closed valve, the valve remains closed, thus preventing the free flow of gases (or liquids) through the valve, In some embodiments some of the valves 10, 11, 12 and 13 are normally open valves. A normally open valve is closed, thus stopping the free flow of gases (or liquids), only when a control signal (or some electromotive force) is continuously supplied to the particular valve. That is, when power is not supplied to a particular normally open valve, the valve remains open, thus allowing the free flow of gases (or liquids) through the valve.

In some embodiments some of the valves 10, 11, 12 and 13 are latching valves. A latching valve requires a control signal pulse to switch between "open" and "closed" positions. In the absence of a control signal pulse (or another electromotive pulse) a latching valve remains in the position it is in without change.

During normal (i.e. energy producing or an "on" state) operation of the fuel cell module 300 the valves 10, 11, 12 and 13 are open permitting the free flow of gases (and liquids) to/from the respective ports 202, 203, 204 and 205. Moreover, power is supplied to the blower 60, the flow control device 14 and the hydrogen re-circulation pump 16 to regulate the inflows of reactant gases into the fuel cell stack 200. Those skilled in the art will appreciate that other supporting elements are supplied with power accordingly and that energy produced by the fuel cell module 300 is coupled from the electrical connections 18*a,b*.

Oxidant for the cathode electrodes in the fuel cell stack 200 is obtained from air, which, again, is made up of approximately 20% oxygen. The blower 60 forces air into the cathode inlet port 202 via the open input valve 10. Once inside the cathode electrodes some of the oxygen from the air is employed in the electrochemical reaction (2) described above.

Hydrogen fuel travels through the fuel supply port 107 into the anode inlet port 204 via the hydrogen reservoir 19 and the flow control device 14. The hydrogen recirculation pump 16 also contributes to the hydrogen fuel supply delivered to the anode inlet port 204, as it operates to force some portion of the unused hydrogen, that is expelled from the anode outlet port 205 back into the anode inlet port 204. Once inside the anode electrodes some of the hydrogen is employed in electrochemical reaction (1) described above.

Excess exhaust gases and liquids from the cathode outlet port 203 and the anode outlet port 205 flow through the corresponding output valves 11 and 13 and out of the fuel cell module 300 through exhaust ports 108 and 109, respectively.

The check valve 15 remains closed during normal operation since the pressure in the cathode inlet port 203 is equal to or greater than the air pressure of the ambient environment.

When a conventional fuel cell module is shutdown the conditions within the fuel cell stack change. The conditions change because elements that support and regulate the operation of the fuel cell stack switch to their respective shutdown states. For example, the input and output valves are closed, which cuts off the supply inflows and exhaust outflows. Moreover, when an element such as a flow control device switches to a shutdown state internal conditions, such as for example, the pressure within the anode electrodes change. When the internal conditions of the fuel cell stack change the hydrogen and oxygen remaining in the fuel cell stack and the feed lines (between the fuel cell stack and the closed valves) are often substantially consumed in combustion reactions as opposed to being consumed in the electrochemical reactions (1) and (2), as described above.

The fuel cell module 300 illustrated in FIG. 2 is not a conventional fuel cell module, as the components of the fuel cell module 300 are configured to passively reduce the overall amount of combustion of hydrogen and oxygen within the fuel cell stack 200 during a shutdown process. This is accomplished by passively inducing an increase in the electrochemical consumption of hydrogen and oxygen that is left inside the fuel cell module 300 relative to what would normally occur during a shutdown process in a conventional fuel cell module.

In particular, the hydrogen reservoir 19 serves as a source for a sufficient amount of additional hydrogen fuel for the fuel cell stack 200 after the input valve 12 has been closed. Briefly, the additional hydrogen fuel drawn from the hydrogen reservoir 19, in combination with other parts of the fuel cell module 300, induces the electrochemical consumption of the oxygen remaining inside the fuel cell stack 200. Also, since the source of the oxygen is air (which is approximately 80% nitrogen) the electrodes within the fuel cell stack 200 are passively blanketed with nitrogen. A high concentration of nitrogen reduces the amount of combustion that occurs within the fuel cell stack 200. The passive blanketing process is a function of the change in pressures within the fuel cell module 300 and specifically within the fuel cell stack 200. The blanketing process that occurs during a shutdown process is described in detail below with reference to FIG. 3 and continued reference to FIG. 2.

Figure 3:
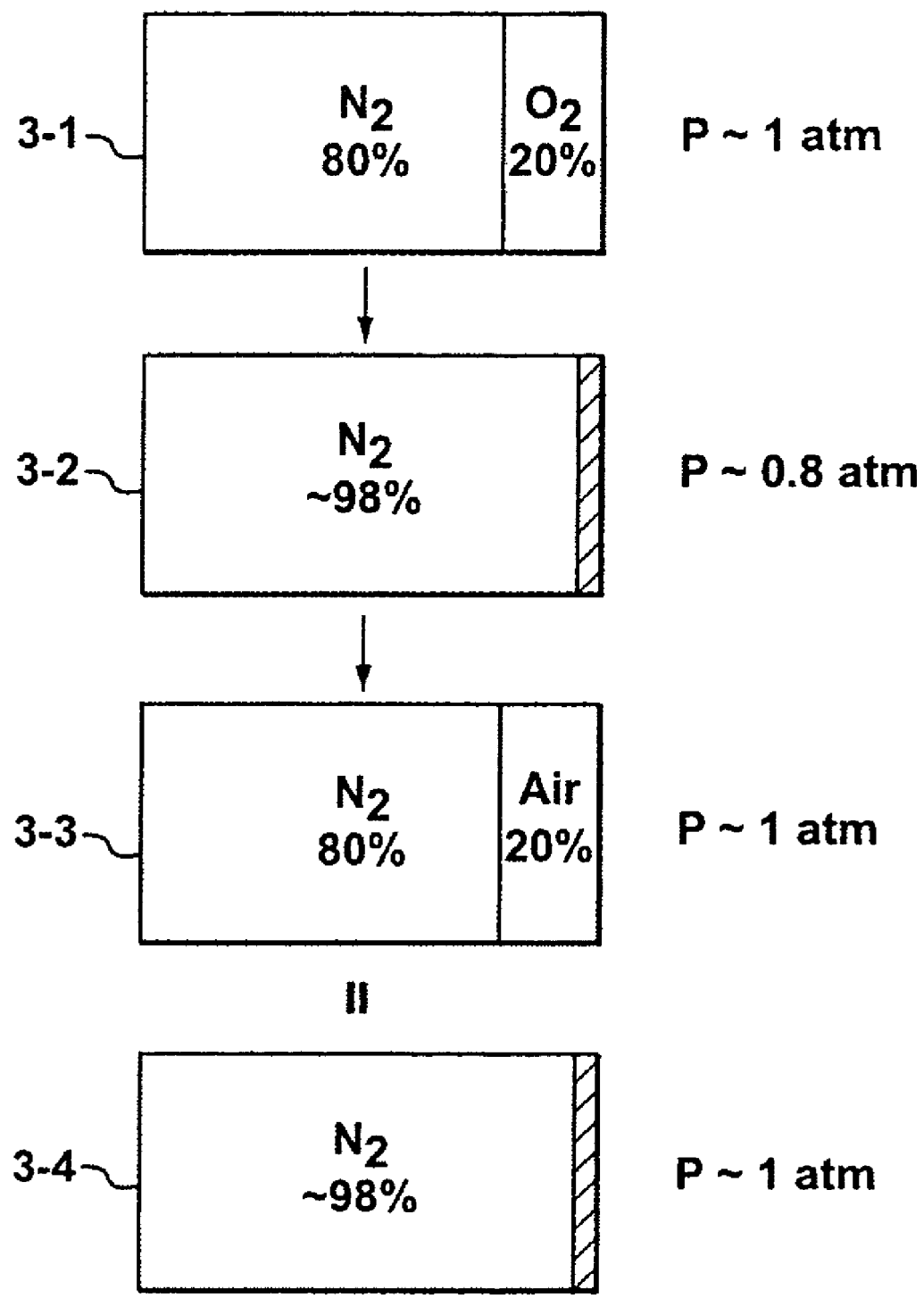
FIG. 3 is a chart illustrating the composition of gases present in cathode electrodes of the fuel cell module shown in FIG. 2 during sequential stages of a shutdown process.

FIG. 3 shows a chart illustrating an approximate and simplified breakdown of the mixture of gases present in the cathode electrodes of the fuel cell stack 200 shown in FIG. 2 during sequential stages of a shutdown period. FIG. 3 is provided only as an aid for the visualization of a substantially continuous and fluid process and it is in no way intended to limit the scope of the invention as claimed in the following section.

When the fuel cell module 300 is shutdown the inflows of reactant gases (hydrogen fuel and oxygen carried in the air) are cutoff so that the fuel cell stack 200 is effectively starved of the reactant gases that are needed to continue the electrochemical reactions (1) and (2). In order to do this, the valves 10, 11, 12 and 13 are closed and the power supplied to the blower 60, the flow control device 14 and the hydrogen recirculation pump 16 is cut-off. Closing the output valves 11 and 13 reduces the amount of gases that leak into the cathode and anode electrodes, respectively, via the corresponding outlets 203 and 205, when the fuel cell module 300 is shut down.

The role of the parasitic load 17, whether it is connected permanently or not, is to limit the voltage of the fuel cell stack 200 (i.e. the stack voltage) when the fuel cell module 300 is shutdown and/or de-coupled from the actual load. If the parasitic load 17 is not connected permanently, the parasitic load 17 is coupled across the electrical connections 18*a,b* immediately before or after a shutdown process is initiated. Preventing the output voltage of the fuel cell stack 200 from reaching a very high level helps to limit an electrochemical corrosion mechanism that can be triggered by a high stack voltage. The presence of the parasitic load 17 further induces the electrochemical consumption of the hydrogen and oxygen remaining within the fuel cell module 300 when a shutdown process is initiated.

Specifically, the parasitic load 17 passively induces the electrochemical consumption of the remaining reactant gases by providing a path for current and voltage to be discharged from the fuel cell stack 200. As the concentration of the reactant gases is reduced on either one or both of the anode or cathode electrodes, the electrochemical potential of the constituent fuel cells (measured as voltage) of the fuel cell stack 200 decreases. If the parasitic load 17 is a simple resistor, as the fuel cell voltage decreases, the corresponding current flowing through the resistor also decreases. This coupling between the gradual decrease in fuel cell voltage potential and the resulting decrease in current dissipation from a static resistor results in a gradual decrease in fuel cell voltage without the danger of fuel cells going negative within the fuel cell stack, as would be the case if a larger current draw was occurring without sufficient supply of reactant gases.

Referring now to 3-1 in FIG. 3, immediately after a shutdown process is initiated the cathode electrodes within the fuel cell stack 200 contain a mixture of gases that roughly corresponds to the composition of air (on earth). That is, each cathode electrode in the fuel cell stack 200 contains a mixture of gases that is approximately 80% nitrogen and 20% oxygen (ignoring traces of other gases). The pressure in each cathode electrode is approximately the same as the air pressure in the ambient environment (e.g. about 1 atm).

As the conditions within the fuel cell stack change (for reasons discussed above) the oxygen in the cathode electrodes of the fuel cell stack 200 is primarily electrochemically consumed according to electrochemical reactions (1) and (2). The required hydrogen fuel used to sustain the electrochemical reactions (1) and (2) is supplied from the hydrogen reservoir 19. As the oxygen is consumed the volume of the gas mixture in the cathode electrodes drops significantly causing a corresponding drop in internal pressure within the cathode electrodes. Illustrated at 3-2 of FIG. 3 is an example of the breakdown of a mixture of gases within the cathode electrodes after the oxygen has been substantially consumed. Nitrogen makes up approximately 98% of the gases present in the cathode electrodes and the pressure within the cathode electrodes is approximately 0.8 atm.

With continued reference to FIG. 2, since the internal pressure within the cathode electrodes of the fuel cell stack 200 falls below the air pressure of the ambient environment the check valve 15 opens, presuming that the cracking pressure has been exceeded. Additional air flows into the fuel cell module 300 via the air supply port 106 and the open check valve 15 leading to a new mixture of gases in the cathode electrodes. The check valve 15 closes when the pressure within the cathode electrodes rises to a level sufficient to close the check valve (taking into consideration the tolerances of the check valve used), which will happen after a sufficient amount of air enters the cathode electrodes. When a conventional check valve is used a spring will force the valve to close once the pressure within the cathode electrodes has risen enough that a delta pressure is below the check valve cracking pressure.

Assuming that the check valve were to remain open until the pressure with the cathode electrode was approximately equivalent to that of the ambient environment, the breakdown of the new mixture of gases is illustrated at 3-3 of FIG. 3. The new mixture of gases consists of 80% nitrogen from the original mixture of gases illustrated at 3-1, and 20% of newly added air. Taking into consideration that air is about 80% nitrogen, the equivalent breakdown of the new mixture of gases shown at 3-3 is illustrated at 3-4 of FIG. 3. The total amount of nitrogen present in the cathode electrodes is about 96% and the pressure is about the same as the air pressure of the ambient environment (e.g. 1 atm). This process is repeated, with the oxygen present in the cathode electrode (being approximately 4% of the cathode electrode volume) being electrochemically consumed with hydrogen provided from the hydrogen reservoir 19. In turn, the void created in the cathode electrodes by the oxygen consumption would be filled with air from the ambient environment (once again composed of approximately 80% nitrogen and 20% oxygen). Consequently, the cathode electrodes of the fuel cell stack 200 are blanketed with predominantly nitrogen gas by this substantially continuous process.

Furthermore, the arrangement of the fuel cell module 300 illustrated in FIG. 2 also induces passive nitrogen blanketing of the anode electrodes in the fuel cell stack 200. As the hydrogen fuel from the hydrogen reservoir 19 is consumed, the volume of the gas mixture present in the anode electrodes drops, which, subsequently results in a corresponding pressure drop within the anode electrodes. The pressure drop within the anode electrodes induces a pressure gradient to be established across the respective membranes from the cathode to the anode side of each membrane in the fuel cell stack 200. This pressure gradient will passively draw nitrogen across the membranes from the respective cathode electrodes to the anode electrodes, thus, causing the anode electrodes to be blanketed with nitrogen as well.

Those skilled in the art will appreciate that the blanketing of the cathode and the anode electrodes occurs in concert in a continuous and fluid manner and it is thus difficult to illustrate this process in discrete steps. Thus, the description provided above is not intended to limit the scope of the invention to a specific sequence of discrete events or processes.

In accordance with aspects of some embodiments of the invention described herein, it will be understood that, in order to achieve effective blanketing of the anode and cathode electrodes with nitrogen of atmospheric pressure, it is necessary to provide sufficient access to additional air to leave a high concentration of nitrogen remaining after the oxygen has been almost completely consumed. This in turn requires a near stoichiometric amount of hydrogen to be supplied to the anode electrodes of a fuel cell stack to facilitate the electrochemical consumption of the oxygen. More generally, at least one reactant supplied to a fuel cell must be provided with a non-reactive agent that remains within the fuel cell after the reactants have been almost completely electrochemically consumed by one another.

Figure 4:
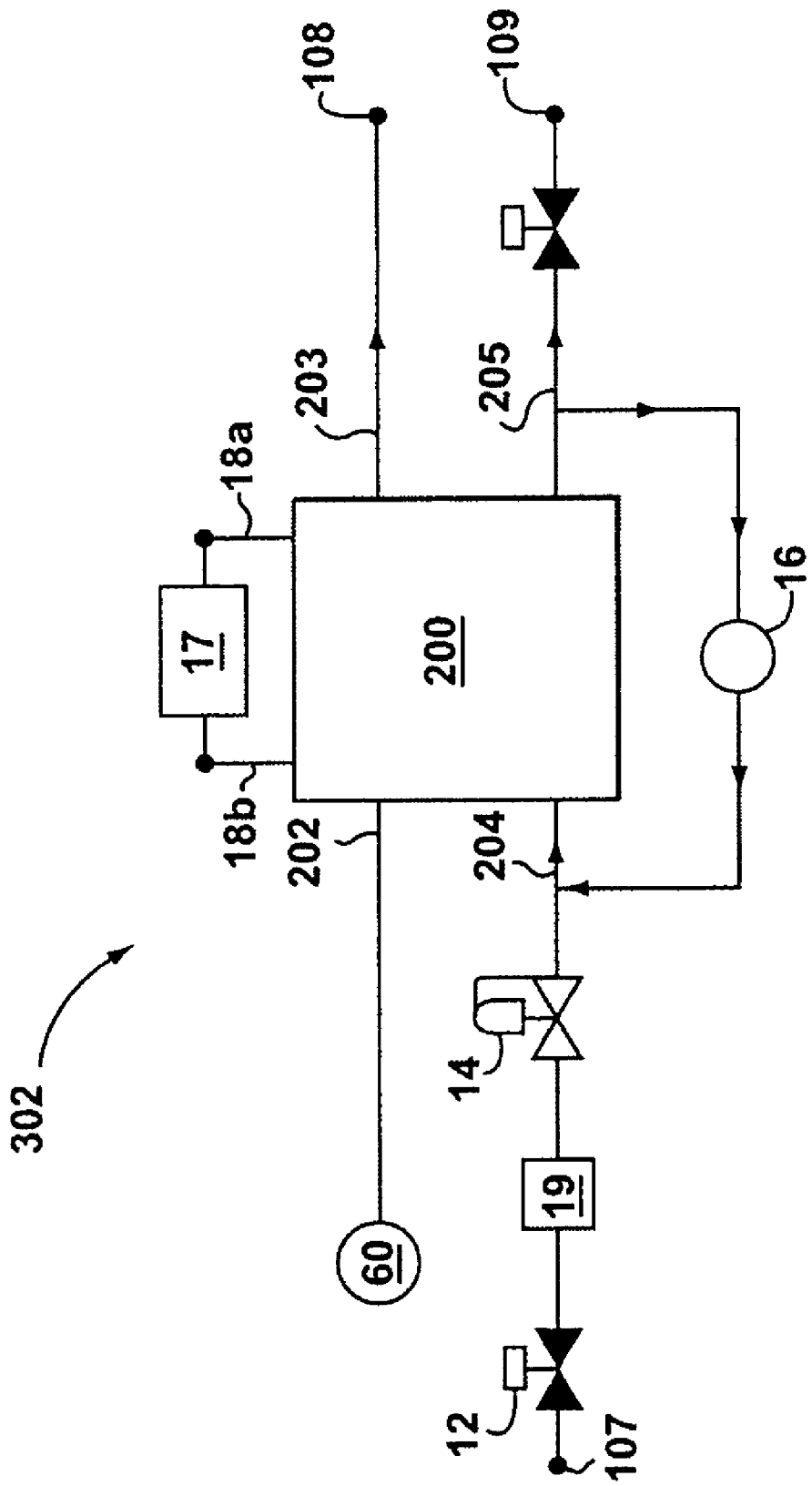
FIG. 4 is a schematic diagram illustrating a second arrangement of a fuel cell module according to aspects of another embodiment of the invention.

Referring to FIG. 4, shown is a schematic diagram illustrating a fuel cell module 302 according to aspects of another embodiment of the invention. Those skilled in the art will appreciate that a fuel cell module includes a suitable combination of supporting elements and that the fuel cell module 302 is illustrated showing only those elements necessary to describe aspects of an embodiment of the invention.

The fuel cell module 302 illustrated in FIG. 4 is similar to the fuel cell module 300 illustrated in FIG. 2. Accordingly, elements common to both fuel cell modules 300 and 302 share common reference indicia. The differences between the two fuel cell modules 300 and 302 are that the fuel cell module 302 does not include input valve 10, output valve 11, check valve 15 and air supply port 106.

The blower 60, illustrated in FIG. 4 is coupled to the cathode inlet port 202 without a valve (e.g. input valve 10) arranged there between. The blower 60 is any device (e.g., a motorized fan, a compressor, etc.) that serves to force air into the cathode inlet port 202. The blower 60 also serves to passively deter, but not necessarily stop, the free flow of air into the cathode inlet port 202 when power is cut-off from the blower 60.

During normal operation, the fuel cell module 302 operates in a substantially identical manner to fuel cell module 300 described above.

During a shutdown process the operation of the fuel cell module 302 is similar to the operation of the fuel cell module 300; however, as already noted, there is no check valve to deter and permit free air flow into the cathode inlet port 202. Instead, the flow of air into the cathode inlet port 202 is slowed down enough by the path through the blower 60 that the oxygen remaining in the cathode electrodes of the fuel cell stack 200 (when the fuel cell module 300 is shutdown) is substantially electrochemically consumed before additional air flows into the cathode electrodes to replace the lost volume of the consumed oxygen. That is, with further reference to FIG. 3, the breakdown of the mixture of gases in the cathode electrodes is similar to what is shown at 3-2 before additional air is passively drawn into the cathode electrodes by the relative drop in pressure. Once additional air makes its way through the blower 60 into the cathode electrodes of the fuel cell stack 200 the breakdown in the mixture of gases in the cathode electrodes is similar to what is shown in 3-3 (and, equivalently 3-4).

In other words, the partial restriction of the air flow through the blower 60 prevents the continuous, rapid replenishment of the electrochemically consumed oxygen on the cathode electrode which would prevent the formation of a predominately nitrogen rich gas composition on the cathode electrode. Thus a gradual depletion of oxygen concentration on the cathode electrode follows a similar process as described above with respect to FIG. 2, with the exception that no large measurable vacuum is created in the cathode electrodes. Rather the electrochemical depletion of oxygen creates a volumetric void and a localized depleted oxygen concentration in the cathode electrodes that draws additional air to the electrode surface (through a combination of pressure and concentration differential driving forces).

Moreover, since there is no output valve (e.g. output valve 11) to block the path from the cathode outlet port 203 to the first exhaust port 108, some air flows into the cathode electrodes via the cathode outlet port 203 and the first exhaust port 108. Also, as described above with respect to FIG. 2, as hydrogen is consumed, in the fuel cell module 302 (of FIG. 4), the pressure in the anode electrodes drops causing nitrogen to be drawn across the respective membranes.

It should also be noted that since valves 10 and 11 from FIG. 2 are not included in system 302, air will continue to diffuse into the cathode electrode. Over time this will cause the gas composition in the cathode electrodes to equalize to approximately that of the surrounding atmosphere. This in turn will gradually result in a change in concentration in the anode electrode gas composition, such that over an extended period of time it can be assumed that both the anode and cathode electrode gas compositions will be approximately that of the surrounding atmosphere. In such embodiments slightly higher levels of degradation are expected compared to the previous examples described above.

Again, those skilled in the art will appreciate that the blanketing of the cathode and the anode electrodes occurs in concert in a continuous and fluid manner and it is thus difficult to illustrate this process in discrete steps. Thus, the description provided above is not intended to limit the scope of the invention to a specific sequence of discrete events or processes.

Figure 5:
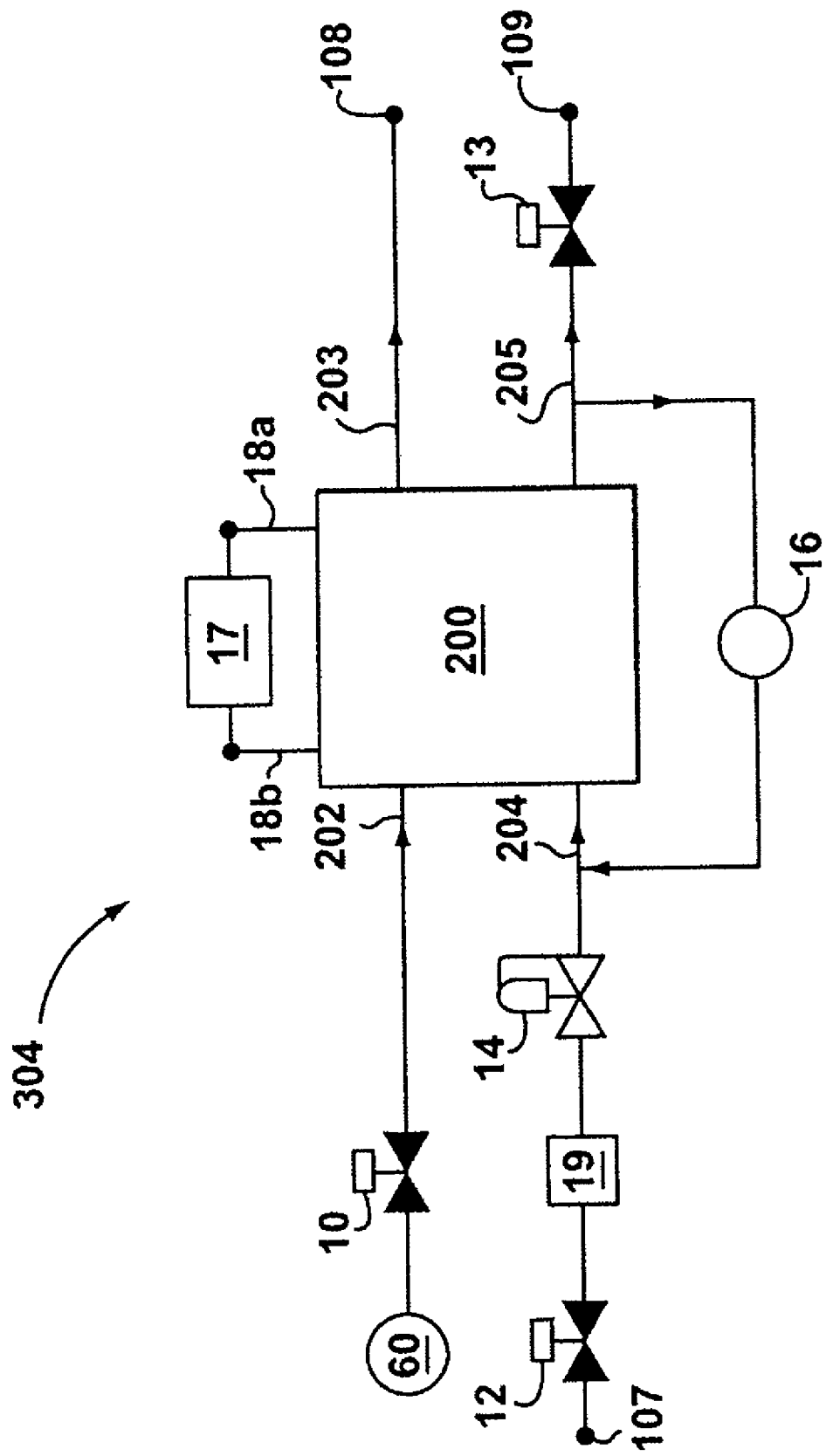
FIG. 5 is a schematic diagram illustrating a third arrangement of a fuel cell module according to aspects of another embodiment of the invention.

Referring to FIG. 5, shown is a schematic diagram illustrating a fuel cell module 304 according to aspects of another embodiment of the invention. Those skilled in the art will appreciate that a fuel cell module includes a suitable combination of supporting elements and that the fuel cell module 304 is illustrated showing only those elements necessary to describe aspects of an embodiment of the invention.

The fuel cell module 304 illustrated in FIG. 5 is similar to the fuel cell module 300 illustrated in FIG. 2. Accordingly, elements common to both fuel cell modules 300 and 304 share common reference indicia. The differences between the two fuel cell modules 300 and 304 are that the fuel cell module 304 does not include output valve 11, check valve 15 and air supply port 106.

During normal operation the fuel cell module 304 operates in a substantially identical manner to fuel cell module 300, described above.

During a shutdown process the operation of the fuel cell module 304 is similar to the operation of the fuel cell module 302 described above. Again, there is no check valve to deter and permit free air flow into the cathode inlet port 202. Moreover, the input valve 10 is arranged between the blower 60 and the cathode inlet port 202, so additional air cannot flow into the cathode electrodes of the fuel cell stack 200 via the blower 60 during a shutdown process since the input valve 10 is closed. Instead, the flow of air into the cathode electrodes comes through the cathode outlet port 203 via the first exhaust port 108. In such an embodiment it is desirable to size and/or shape the first exhaust port 108 such that the flow of air in the reverse direction is slowed down enough by the reverse path through the first exhaust port 108 so that the oxygen remaining in the cathode electrodes of the fuel cell stack 200 (when the fuel cell module 300 is shutdown) is substantially electrochemically consumed before additional air flows into the cathode electrodes to replace the lost volume of the consumed oxygen. That is, with further reference to FIG. 3, the breakdown of the mixture of gases in the cathode electrodes is similar to what is shown at 3-2 before additional air is passively drawn into the cathode electrodes by the relative drop in pressure. Once additional air makes its way through the blower 60 into the cathode electrodes of the fuel cell stack 200 the breakdown in the mixture of gases in the cathode electrodes is similar to what is shown in 3-3 (and, equivalently 3-4). Also, as described above with respect to FIG. 2, as hydrogen is consumed, in the fuel cell module 304 (of FIG. 5), the pressure in the anode electrodes drops causing nitrogen to be drawn across the respective membranes.

Again, those skilled in the art will appreciate that the blanketing of the cathode and the anode electrodes occurs in concert in a continuous and fluid manner and it is thus difficult to illustrate this process in discrete steps. Thus, the description provided above is not intended to limit the scope of the invention to a specific sequence of discrete events or processes.

Figure 6:
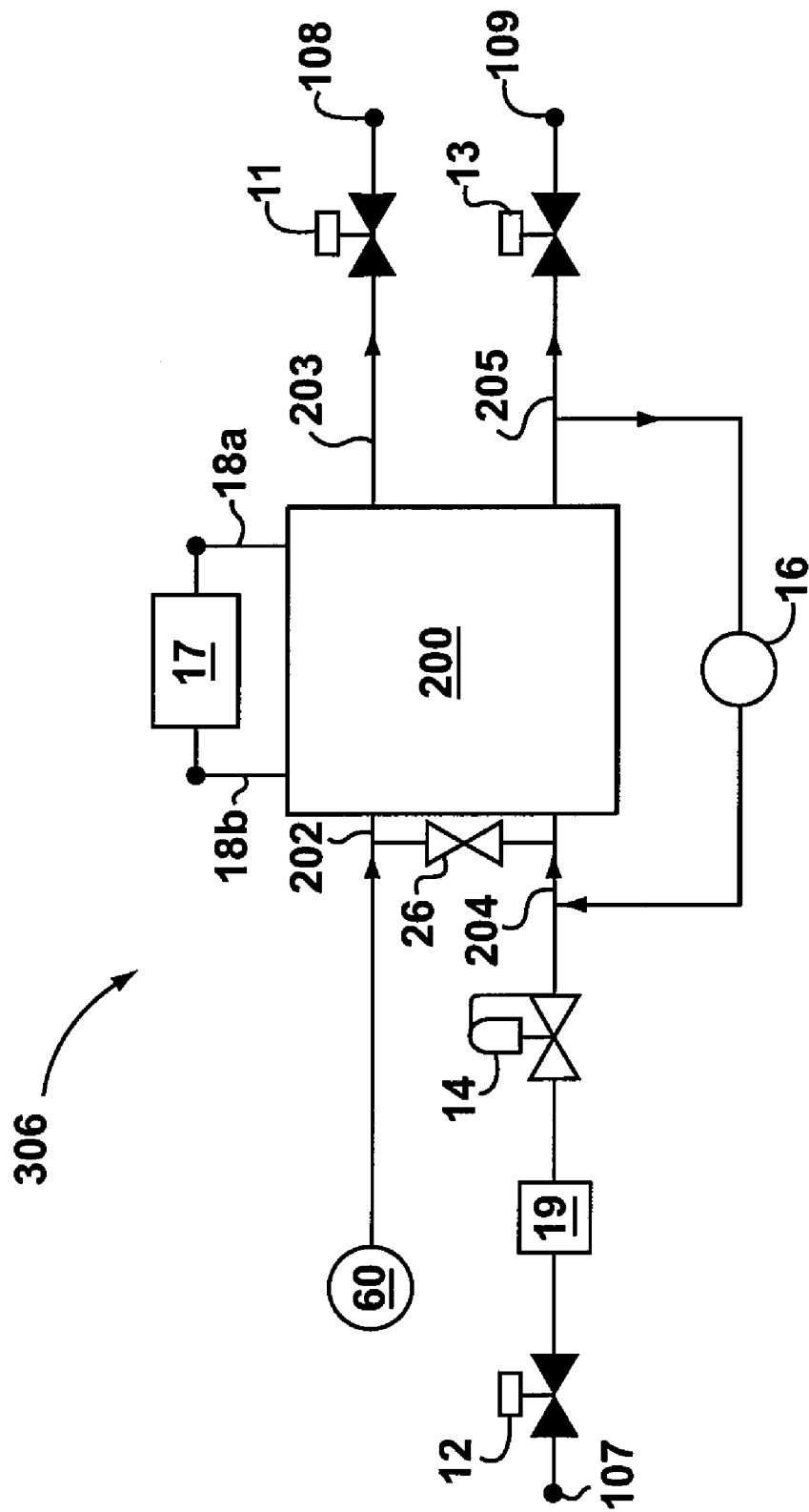
FIG. 6 is a schematic diagram illustrating a fourth arrangement of a fuel cell module according to aspects of another embodiment of the invention.

Referring to FIG. 6, shown is a schematic diagram illustrating a fuel cell module 306 according to aspects of another embodiment of the invention. Those skilled in the art will appreciate that a fuel cell module includes a suitable combination of supporting elements and that the fuel cell module 306 is illustrated showing only those elements necessary to describe aspects of an embodiment of the invention.

The fuel cell module 306 illustrated in FIG. 6 is similar to the fuel cell module 300 illustrated in FIG. 2. Accordingly, elements common to both fuel cell modules 300 and 306 share common reference indicia. The differences between the two fuel cell modules 300 and 306 are that the fuel cell module 306 does not include input valve 10, check valve 15 and air supply port 106.

As in FIG. 4, the blower 60 illustrated in FIG. 6 is coupled to the cathode inlet port 202 without a valve (e.g. input valve 10) arranged there between. The blower 60 is any device (e.g., a motorized fan, a compressor, etc.) that serves to force air into the cathode inlet port 202. The blower 60 also serves to passively deter, but not necessarily stop, the free flow of air into the cathode inlet port 202 when power is cut-off from the blower 60.

During normal operation the fuel cell module 306 operates in a substantially identical manner to fuel cell module 300, described above.

During a shutdown process the operation of the fuel cell module 306 is similar to the operation of the fuel cell modules 300 and 302; however, as already noted, there is no check valve to deter and permit free air flow into the cathode inlet port 202. Instead, the flow of air into the cathode inlet port 202 is slowed down enough by the path through the blower 60 that the oxygen remaining in the cathode electrodes of the fuel cell stack 200 (when the fuel cell module 300 is shutdown) is substantially electrochemically consumed before additional air flows into the cathode electrodes to replace the lost volume of the consumed oxygen. That is, with further reference to FIG. 3, the breakdown of the mixture of gases in the cathode electrodes is similar to what is shown at 3-2 before additional air is passively drawn into the cathode electrodes by the relative drop in pressure. Once additional air makes its way through the blower 60 into the cathode electrodes of the fuel cell stack 200 the breakdown in the mixture of gases in the cathode electrodes is similar to what is shown in 3-3 (and, equivalently 3-4).

Moreover, since the fuel cell module 306 includes the output valve 11, additional air is prevented from entering the cathode outlet port 203 during a shutdown process since the output valve 11 is closed during the shutdown process. Also, as described above with respect to FIG. 2, as hydrogen is consumed, in the fuel cell module 306 (of FIG. 6), the pressure in the anode electrodes drops causing nitrogen to be drawn across the respective membranes.

Again, those skilled in the art will appreciate that the blanketing of the cathode and the anode electrodes occurs in concert in a continuous and fluid manner and it is thus difficult to illustrate this process in discrete steps. Thus, the description provided above is not intended to limit the scope of the invention to a specific sequence of discrete events or processes.

With reference to FIGS. 2, 4, 5 and 6, as an alternative an for fuel cell modules 300, 302,304,306 an optional second check valve 26 (illustrated only in FIG. 6) can be coupled between the anode inlet port 204 and the cathode inlet port 202. The second check valve 26 is configured to open when there is a pre-determined pressure differential between the pressure in the anode electrode(s) and the cathode electrode(s) during a shutdown process permitting flow from only the cathode electrodes(s) to the anode electrode(s); and, during normal operation the second check valve 26 is configured to remain closed.

The second check valve 26 is used to ensure that nitrogen from the cathode electrodes is passed to the anode electrodes when a sufficient portion of the hydrogen fuel from the hydrogen reservoir 19 is consumed electrochemically, which will result in a corresponding pressure drop as described above. This is to supplement and/or replace the need for nitrogen diffusion across the respective membranes in the fuel cell stack 200, as a means for blanketing the anode electrode(s).

What has been described is merely illustrative of the application of the principles of the invention. Those skilled in the art would appreciate that other arrangements are possible without departing from the scope of the present invention. It is therefore to be understood that within the scope of the appended claims, the invention may be practiced otherwise than as specifically described herein.

I claim:

1. A fuel cell module, for use with hydrogen as a first reactant and air, including oxygen as a second reactant and nitrogen as a non-reactive agent, the fuel cell module comprising:

a fuel cell stack including at least one fuel cell, each fuel cell including an anode electrode, a cathode electrode and an electrolyte medium, comprising a proton exchange membrane, arranged between the anode electrode and the cathode electrode, wherein during normal operation the anode electrode is provided with the first reactant and the cathode electrode is provided with air;

a parasitic load that is connectable across the anode and the cathode electrodes; and, a reactant reservoir, connectable to the anode electrode of each fuel cell, for storing an amount of the first reactant suitable for a shutdown process of the fuel cell module, whereby, in use when the fuel cell module is shutdown, the stored amount of the first reactant is drawn from the reactant reservoir and electrochemically reacts with an amount of the second reactant remaining in the fuel cell module, to electrochemically consume all of the amounts of the first and second reactants, thereby leaving a second mixture that substantially comprises the non-reactive agent wherein the fuel cell stack comprises:

a cathode inlet port for supplying the first mixture to the cathode electrodes;

a cathode outlet port for evacuating un-reacted amounts of the second reactant, amounts of the non-reactive agent and exhaust products from the cathode electrodes;

an anode inlet port, fluidly connectable to the reactant reservoir, and for supplying the first reactant to the anode electrodes; and, an anode outlet port for evacuating un-reacted amounts of the first reactant and exhaust products from the anode electrodes; wherein the fuel cell module further comprises:

a hydrogen supply port;

an anode input valve, connectable between the hydrogen supply port and the reactant reservoir, for cutting-off a flow of hydrogen from the hydrogen supply port to the anode inlet port during the shutdown process; and a check valve connectable between the cathode inlet port and the anode inlet port;

wherein the check valve opens at a predetermined pressure differential between an internal pressure in the cathode electrodes and an internal pressure in the anode electrodes, and remains closed when the internal pressures are approximately the same.

2. A process for shutting down a fuel cell, the fuel cell including a first electrode, a second electrode and an electrolyte membrane arranged between the first and second electrodes, wherein during normal operation the first electrode is provided with a first reactant and the second electrode is provided with a first mixture containing a second reactant and a non-reactive agent, the process comprising:

stopping an inflow of the first reactant into the first electrode;

cutting-off power to supporting elements of the fuel cell;

drawing current through a parasitic load connectable across the first arid second electrodes;

providing a pre-stored near stoichiometric amount of a first reactant for the electrochemical consumption of a remaining amount of a second reactant; and, permitting a delayed inflow of an amount of the first mixture into the second electrode;

wherein the near stoichiometric amount of the first reactant electrochemically reacts with the remaining amount of the second reactant, thereby leaving a second mixture that substantially comprises the non-reactive agent.

3. A fuel cell module comprising:

A fuel cell stack including at least one fuel cell, each fuel cell including an anode electrode and the cathode electrode, wherein during normal operation the anode electrode is provided with a first reactant and the cathode electrode is provided with a first mixture containing a second reactant and a non-reactive agent;

a parasitic load that is connectable across the anode and the cathode electrodes; and, a reactant reservoir, connectable to the anode electrode, for storing an amount of the first reactant suitable for a shutdown process of the fuel cell module, whereby, in use when the fuel cell module is shutdown, the stored amount of the first reactant is drawn from the reactant reservoir and electrochemically reacts with an amount of the second reactant remaining in the fuel cell module, to electrochemically consume all of the amounts of the first and second reactants, thereby leaving a second mixture that substantially comprises the non-reactive agent, wherein the reactant reservoir is sized such that the amount of the first reactant stored in the reactant reservoir is less than enough to electrochemically consume the entire amount of the second reactant remaining in the fuel cell module during the shutdown process so as to deter other undesired reactions from occurring, and refillable during the shutdown process so that almost all of the remaining amount of the second reactant is electrochemically consumed by additional amounts of the first reactant added to the reactant reservoir during the shutdown process.

4. A fuel cell module according to claim 3, wherein the fuel cell stack comprises:

a cathode inlet port for supplying the first mixture to the cathode electrodes;

a cathode outlet port for evacuating un-reacted amounts of the second reactant, amounts of the non-reactive agent and exhaust products from the cathode electrodes;

an anode inlet port, fluidly connectable to the reactant reservoir, and for supplying the first reactant to the anode electrodes; and, an anode outlet port for evacuating un-reacted amounts of the first reactant and exhaust products from the anode electrodes.

5. A fuel cell module according to claim 4, wherein the electrolyte medium is a Proton Exchange Membrane (PEM).

6. A fuel cell module according to claim 3, further comprising a flow control device connectable to the anode electrode for regulating a flow of the first reactant delivered to the anode electrode.

7. A fuel cell module according to claim 3, wherein the reactant reservoir is one of a vessel, a pressurized vessel and a length of tubing.

8. A fuel cell module according to claim 3, wherein the parasitic load includes at least one of internal resistances of the fuel cell module and an external resistance element.

9. A fuel cell module comprising:

a fuel cell stack including at least one fuel cell, each fuel cell including an anode electrode, a cathode electrode and an electrolyte medium arranged between the anode electrode and the cathode electrode, wherein during normal operation the anode electrode is provided with a first reactant and the cathode electrode is provided with a first mixture containing a second reactant and a non-reactive agent;

a parasitic load that is connectable across the anode and the cathode electrodes; and, a reactant reservoir, connectable to the anode electrode, for storing an amount of the first reactant suitable for a shutdown process of the fuel cell module, whereby, in use when the fuel cell module is shutdown, the stored amount of the first reactant is drawn from the reactant reservoir and electrochemically reacts with an amount of the second reactant remaining in the fuel cell module, to electrochemically consume all of the amounts of the first and second reactants, thereby leaving a second mixture that substantially comprises the non-reactive agent, wherein the reactant reservoir is sized such that a near stoichiometric amount of the first reactant stored in the reactant reservoir to electrochemically consume the amount of the second reactant remaining in the fuel cell module during the shutdown process so as to deter other undesired reactions from occurring and cause respective pressure drops within the fuel cell module as the remaining amounts of the first and second reactants are electrochemically consumed.

10. A fuel cell module according to claim 9, wherein the fuel cell stack comprises:

a cathode inlet port for supplying the first mixture to the cathode electrodes;

a cathode outlet port for evacuating un-reacted amounts of the second reactant, amounts of the non-reactive agent and exhaust products from the cathode electrodes;

an anode inlet port, fluidly connectable to the reactant reservoir, and for supplying the first reactant to the anode electrodes; and, an anode outlet port for evacuating un-reacted amounts of the first reactant and exhaust products from the anode electrodes.

11. A fuel cell module according to claim 10, wherein the electrolyte medium is a Proton Exchange Membrane (PEM).

12. A fuel cell module according to claim 11, wherein the first reactant is hydrogen, the second reactant is oxygen carried in the air and the non-reactive agent is nitrogen carried in the air.

13. A fuel cell module according to claim 12, further comprising:

a hydrogen supply port; and, an anode input valve, connectable between the hydrogen supply port and the reactant reservoir, for cuffing-off a flow of hydrogen from the hydrogen supply port to the anode inlet port during the shutdown process.

14. A fuel cell module according to claim 13, further comprising an anode output valve, connectable to the anode outlet port, for sealingly closing off the anode outlet port during the shutdown process.

15. A fuel cell module according to claim 13, further comprising a blower, connectable between the cathode inlet port and an air supply, for forcing air into the cathode electrodes during normal operation.

16. A fuel cell module according to claim 15, wherein the blower is further configured to passively deter, but does not completely stop, the free flow of air into the cathode electrodes during the shutdown process.

17. A fuel cell module according to claim 15, further comprising a cathode input valve, connectable between the blower and the cathode inlet port, for cutting-off a flow of air through the blower into the cathode input port.

18. A fuel cell module according to claim 17, further comprising a check valve, connectable between the cathode inlet port and the air supply, wherein the check valve opens at a predetermined pressure differential between an internal pressure in the cathode electrodes and an air supply pressure, and remains closed when the internal pressure and the air supply pressure are approximately the same.

19. A fuel cell module according to claim 15, further comprising a cathode output valve, connectable to the cathode outlet port, for sealingly closing-off the cathode outlet port during the shutdown process.

20. A fuel cell module according to claim 15, further comprising an exhaust port, connectable to the cathode outlet port, for deterring, but not completely stopping, a free flow of air into the cathode outlet port.

21. A fuel cell module according to claim 9, further comprising a flow control device connectable to the anode electrode for regulating a flow of the first reactant delivered to the anode electrode.

22. A fuel cell module according to claim 9, wherein the reactant reservoir is one of a vessel, a pressurized vessel and a length of tubing.

23. A fuel cell module according to claim 9, wherein the parasitic load includes at least one of internal resistances of the fuel cell module and an external resistance element.

24. A fuel cell module according to claim 11, wherein the first reactant is hydrogen, the second reactant is oxygen carried in the air and the non-reactive agent is nitrogen carried in the air, and wherein the fuel cell module includes:

a hydrogen supply port; and, an anode input valve, connectable between the hydrogen supply port and the reactant reservoir, for cutting-off a flow of hydrogen from the hydrogen supply port to the anode inlet port during the shutdown process.

25. A fuel cell module according to claim 24, further comprising an anode output valve, connectable to the anode outlet port, for sealingly closing off the anode outlet port during the shutdown process, and a blower, connectable between the cathode inlet port and an air supply, for forcing air into the cathode electrodes during normal operation.

26. A fuel cell module according to claim 25, wherein the blower is further configured to passively deter, but does not completely stop, the free flow of air into the cathode electrodes during the shutdown process.

27. A fuel cell module according to claim 26, further comprising a cathode input valve, connectable between the blower and the cathode inlet port, for cutting-off a flow of air through the blower into the cathode input port.

28. A fuel cell module according to claim 27, further comprising a check valve, connectable between the cathode inlet port and the air supply, wherein the check valve opens at a predetermined pressure differential between an internal pressure in the cathode electrodes and an air supply pressure, and remains closed when the internal pressure and the air supply pressure are approximately the same.

29. A fuel cell module according to claim 25, further comprising a cathode output valve, connectable to the cathode outlet port, for sealingly closing-off the cathode outlet port during the shutdown process.

30. A fuel cell module according to claim 24, further comprising:

a hydrogen supply port;

an anode input valve, connectable between the hydrogen supply port and the reactant reservoir, for cutting-off a flow of hydrogen from the hydrogen supply port to the anode inlet port during the shutdown process; and a check valve connectable between the cathode inlet port and the anode inlet port;

wherein the check valve opens at a predetermined pressure differential between an internal pressure in the cathode electrodes and an internal pressure in the anode electrodes, and remains closed when the internal pressures are approximately the same.

31. A fuel cell module according to claim 25, further comprising an exhaust port, connectable to the cathode outlet port, for deterring, but not completely stopping, a free flow of air into the cathode outlet port.

* * * * *